(No Model.) 2 Sheets—Sheet 1.

P. LEEDS.
DEVICE FOR SHAPING MATERIAL TO THE ARC OF ANY DESIRED CIRCLE.

No. 399,675. Patented Mar. 19, 1889.

ATTEST.
S. A. Hageman
J. Cadwallader

INVENTOR,
Pulaski Leeds
By Jeptha Garrard
Atty (No Model.) 2 Sheets—Sheet 2.

P. LEEDS.
DEVICE FOR SHAPING MATERIAL TO THE ARC OF ANY DESIRED CIRCLE.

No. 399,675. Patented Mar. 19, 1889.

ATTEST. INVENTOR.

UNITED STATES PATENT OFFICE.

PULASKI LEEDS, OF LOUISVILLE, ASSIGNOR TO R. T. MILLER, OF COVINGTON, KENTUCKY.

DEVICE FOR SHAPING MATERIAL TO THE ARC OF ANY DESIRED CIRCLE.

SPECIFICATION forming part of Letters Patent No. 399,675, dated March 19, 1889.

Application filed November 22, 1888. Serial No. 291,612. (No model.)

*To all whom it may concern:*

Be it known that I, PULASKI LEEDS, a citizen of the United States, residing at Louisville, State of Kentucky, have invented certain new and useful Improvements in Devices for Shaping Material to the Arc of any Desired Circle, of which the following is a specification, reference being had to the accompanying drawings.

This invention, as here shown, consists of a device for slotting locomotive-links intended to be used in connection with a drill-press, the object being to hold the work securely under the boring-tool and applying it to the tool with such a motion as to mark out or cut any desired circular arc.

Figure 1:
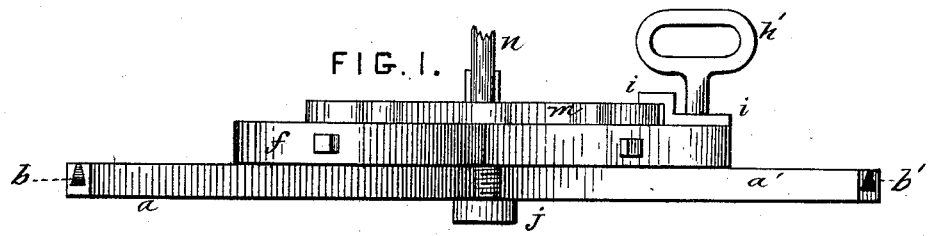
Figure 2:
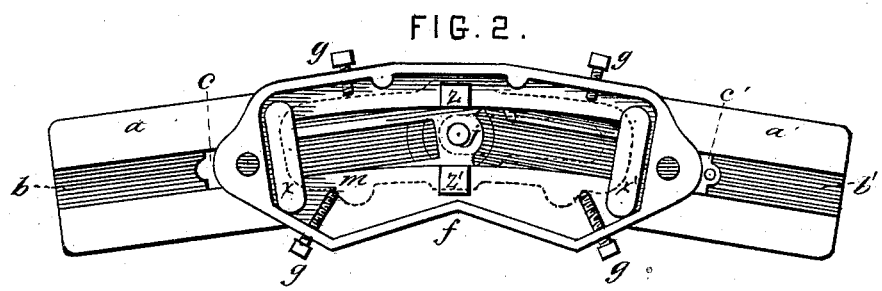
Figure 3:
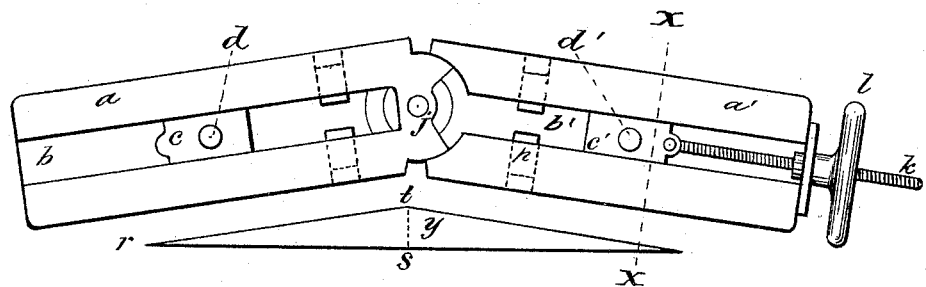
Figure 4:
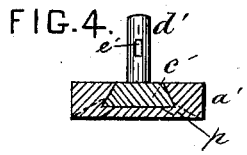
Figure 5:
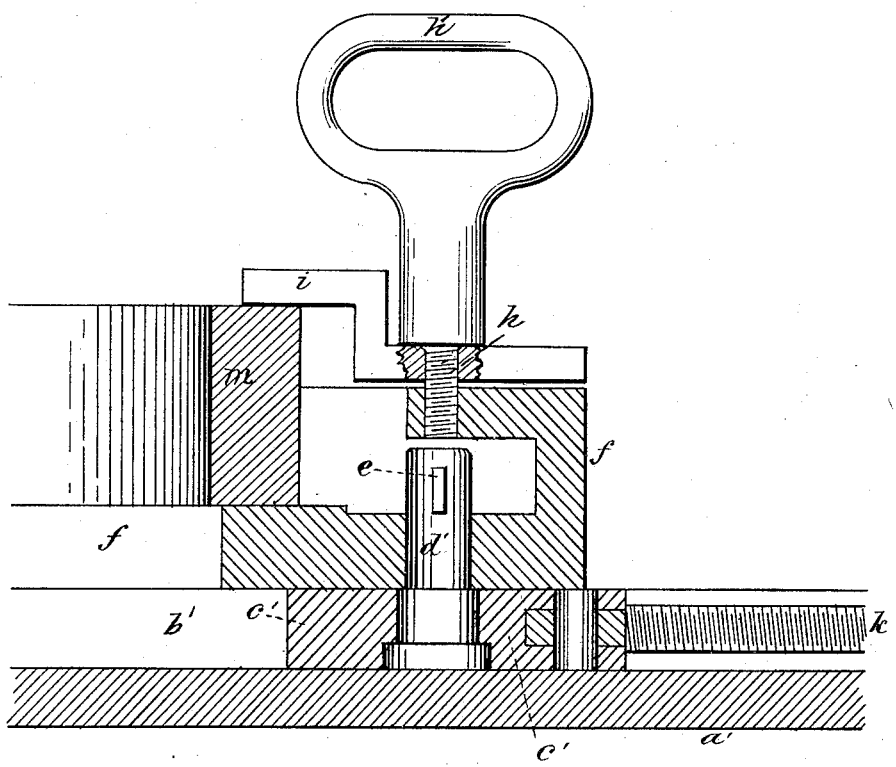

Figure 1 shows the device in elevation with a link in position to be operated upon. Fig. 2 is a plan of the same with link dotted. Fig. 3 is a partial plan with templet $y$ and feed-screw $k$. Fig. 4 is a section through line $x\,x$, Fig. 3. Fig. 5 is a partial longitudinal section through center of slot $b'$, Fig. 1.

The device consists, first, of two bed-plates, $a$ and $a'$, connected by a hinge-joint, $j$, and having a lateral movement, so that they may be placed at any desired angle with each other, being slotted on the upper side centrally and longitudinally, as seen at $b$ and $b'$, and having the sides parallel with the slots; second, two carrier-blocks, $c$ and $c'$, working, respectively, in the slots $b$ and $b'$ of the bed-plates $a$ and $a'$, and each having a perpendicular pin or stud, $d\,d'$, slotted, as shown at $e'$, Fig. 4, to receive a key, as shown at $e$, Fig. 5; third, a husk-box, $f$, resting on the bed-plates $a\,a'$, fitting on the studs $d\,d'$, secured by keys, as shown at $e$, Fig. 5, and furnished with screws $g$ and $h$ and straps $i$, for holding the piece $m$ to be slotted. It is also slotted to allow the escape of cuttings through the opening $p$ in the bed-plates.

$x\,x'$ and $z\,z'$ are slight elevations on the floor of the husk-box, on which the link $m$ rests while being operated upon.

The screw $h$ is a prolongation of the handle $h'$, for convenience of handling the device, as shown in Figs. 1 and 5. A feed-screw, $k$, is attached to one of the carriers $c'$ and operated by a hand-wheel, $l$, by which motion is given to the husk-box $f$ containing the piece $m$ to be slotted.

Operation: The device is placed upon a drill-press with the center of the hinge-joint $j$ directly under the boring-tool $n$ and secured at the proper angle. The piece to be slotted is placed on the husk-box $f$ and secured by the screws $g$ and $h$ and the straps $i$. By operating the screw $k$ the husk-box $f$ moves in such a manner as to cause the tool $n$, placed in a line bisecting the angle formed by the two slots $b$ and $b'$, to cut out a circular arc upon the piece of work to be slotted.

It is obvious that the device may be so set as to describe arcs of the desired magnitude cutting at any desired point on the line bisecting the angle formed by the two slots $b$ and $b'$. This movement of the husk-box and the piece to be slotted may either be continuous while the tool is cutting, or may be used intermittently to set the work for a series of cuttings which will all lie in the same arc, thus enabling the operator to work out the desired slot.

It is obvious that the degree of curvature of the arc cut will depend upon the angle at which the two bed-plates are set. The radius of the desired curve having been determined, the bed-plates can be best set for it by placing in the angle formed by their edges a templet in the form of an isosceles triangle, as shown at $y$, Fig. 3, half, $r\,s$, of whose base will be the sine, and whose altitude $t\,s$ will be the versed sine of the corresponding arc.

Having thus described my invention, the following is what I claim as new therein and desire to secure by Letters Patent:

1. In a slot-cutting device, the combination of the hinged bed-plates, carriers adapted to slide in said slots formed in said bed-plates, and a husk-box secured to said carriers, substantially as described.

2. In a slot-cutting device, the combination of the hinged bed-plates, slotted as described, with the carriers adapted to move in said slots of the bed-plates and carrying the husk-box, and means for regulating the movement of said carriers, substantially as described.

3. The combination of the bed-plates $a\,a'$, hinged and slotted, as described, the carriers $c$ $c'$, furnished with studs $d$ $d'$, and a husk-box pivoted upon said studs and carrying the blank to be operated upon, substantially as described.

4. The herein-described device for cutting slots, consisting of the following elements: bed-plates $a$ $a'$, hinged and slotted, as described, having perforations $p$ near the hinge-joint, carrier $c$ $c'$, husk-box $f$, secured to the carriers by means of studs $d$ $d'$, means for producing movement to carriers $c$ $c'$, and means, substantially as described, for securing the blank to be slotted into the husk-box.

The foregoing specification of my invention signed by me this 27th day of October, A. D. 1888.

PULASKI LEEDS.

Witnesses:
P. J. CADWALLADER,
JEPTHA GARRARD.